US011831807B2

(12) United States Patent
Moreno et al.

(10) Patent No.: US 11,831,807 B2
(45) Date of Patent: *Nov. 28, 2023

(54) SYSTEMS AND METHODS FOR GENERATING CUSTOMIZED CUSTOMER SERVICE MENU

(71) Applicant: Capital One Services, LLC, McLean, VA (US)

(72) Inventors: Jose Moreno, Berkeley, CA (US); Jonatan Yucra Rodriguez, Allentown, PA (US); Andrew Veenstra, San Francisco, CA (US); Vu Nguyen, Pittsburg, CA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/831,542

(22) Filed: Jun. 3, 2022

(65) Prior Publication Data

US 2022/0294905 A1 Sep. 15, 2022

Related U.S. Application Data

(63) Continuation of application No. 17/178,283, filed on Feb. 18, 2021, now Pat. No. 11,368,587.

(51) Int. Cl.
*H04M 3/51* (2006.01)
*H04M 3/42* (2006.01)

(52) U.S. Cl.
CPC ..... *H04M 3/5166* (2013.01); *H04M 3/42068* (2013.01)

(58) Field of Classification Search
CPC .......................... H04M 3/5166; H04M 3/42068

USPC ....................................................... 379/88.01
See application file for complete search history.

(56) References Cited

U.S. PATENT DOCUMENTS

| 7,983,401 B1* | 7/2011 | Krinsky ................ H04M 3/527 |
| | | 455/466 |
| 8,000,454 B1 | 8/2011 | Or-Bach et al. |
| 8,687,777 B1 | 4/2014 | Lavian et al. |
| 8,879,703 B1 | 11/2014 | Lavian et al. |
| 10,447,860 B1* | 10/2019 | Hartman ................ H04M 7/006 |
| 10,601,989 B1* | 3/2020 | Janefalkar ............... H04L 63/08 |

(Continued)

FOREIGN PATENT DOCUMENTS

AU           2017219095          9/2017

*Primary Examiner* — Binh Kien Tieu
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a method that includes receiving profile data associated with a user, the profile data comprising a first phone number, receiving browsing data from a user device associated with the user, storing the browsing data with a store time, receiving a phone call from the first phone number at a call time, identifying the user from the first phone number, retrieving the browsing data, determining whether the store time is within a time threshold of the call time and whether the browsing data comprises trigger data. When the browsing data comprises the trigger data and the store time is within the time threshold of the call time, generate a customized audio IVR menu based on the browsing data and present the customized audio IVR menu to the user over the phone call.

20 Claims, 4 Drawing Sheets

(56) References Cited

U.S. PATENT DOCUMENTS

| | | | |
|---|---|---|---|
| 11,368,587 B1* | 6/2022 | Moreno | H04M 3/5166 |
| 2004/0042593 A1 | 3/2004 | Gulrajani et al. | |
| 2004/0122941 A1* | 6/2004 | Creamer | H04M 3/42059 |
| | | | 709/224 |
| 2012/0227011 A1* | 9/2012 | McCoy | H04N 21/25841 |
| | | | 715/810 |
| 2014/0064463 A1* | 3/2014 | Reddy | H04M 3/493 |
| | | | 379/88.01 |
| 2014/0310651 A1* | 10/2014 | Padgett | G06F 3/0482 |
| | | | 715/810 |
| 2018/0113573 A1* | 4/2018 | Kulus | G05B 19/409 |
| 2018/0146090 A1 | 5/2018 | Lavian et al. | |
| 2018/0247344 A1 | 8/2018 | Feng et al. | |
| 2020/0228651 A1 | 7/2020 | Demsey | |
| 2021/0056587 A1 | 2/2021 | Glidden et al. | |
| 2021/0281682 A1* | 9/2021 | Agarwal | G06F 3/017 |
| 2021/0342925 A1 | 11/2021 | MacDougall et al. | |
| 2022/0345571 A1* | 10/2022 | Chau | H04M 3/567 |

* cited by examiner

SYSTEMS AND METHODS FOR GENERATING CUSTOMIZED CUSTOMER SERVICE MENU

CROSS-REFERENCE TO RELATED APPLICATIONS

This application is a continuation of, and claims priority under 35 U.S.C. § 120 to, U.S. patent application Ser. No. 17/178,283, filed Feb. 18, 2021, the entire contents of which is fully incorporated herein by reference.

FIELD

The disclosed technology relates to systems and methods for automatically generating a customized customer service menu for a user, and more particularly systems and methods for dynamically generating a customized customer service menu that is based on browsing data (e.g., website errors) of the user.

BACKGROUND

Users who call customer service numbers are typically inundated with a very lengthy list of options in an Interactive Voice Response (IVR) menu. After wading through the first round of options, the user is met with another round of options that only sometimes pertain to the issue the user would like to resolve. If the option is available, the user may simply select an option (e.g., presses "0") to wait to speak with an operator who then has to determine the problem and then transfer the user to the appropriate customer service representative. Regardless, this leads many users to be frustrated, to hang up, and/or to take their business elsewhere. Moreover, it overuses customer service representatives to resolve customer issues, which may be both cost inefficient for the organization and time inefficient for customers who have to wait on hold for a human representative to assist them.

Accordingly, there is a need for dynamically generating customized, context aware, IVR menus to quickly direct the user to the appropriate answers. Embodiments of the present disclosure are directed to this and other considerations.

SUMMARY

Disclosed embodiments may include a communication menu generating system that includes one or more processors and a memory in communication with the one or more processors and storing instructions that are configured to cause the communication menu generating system to perform a method. The method may include receiving profile data associated with a user, the profile data comprising a first phone number, receiving browsing data from a user device associated with the user, storing the browsing data with a store time, receiving a phone call from the first phone number at a call time, identifying the user from the first phone number, retrieving the browsing data, determining whether the store time is within a time threshold of the call time and whether the browsing data comprises trigger data. When the browsing data does not comprise the trigger data or the store time is not within the time threshold of the call time, present a default audio interactive voice response (IVR) menu to the user over the phone call. When the browsing data comprises the trigger data and the store time is within the time threshold of the call time, generate a customized audio IVR menu based on the browsing data and present the customized audio IVR menu to the user over the phone call.

Disclosed embodiments may include a communication menu generating system that includes one or more processors and a memory in communication with the one or more processors and storing instructions are configured to cause the communication menu generating system to perform a method. The method may include receiving browsing data from a user device associated with a user, storing the browsing data in a database, receiving a phone call from a first phone number that was previously stored in the database, identifying the user from the first phone number previously stored in the database, determining whether the browsing data was stored within a predetermined time threshold of a current time and comprises trigger data. When the browsing data does not comprise the trigger data or was not stored within the predetermined time threshold of the current time, present a standard audio IVR menu to the user over the phone call. When the browsing data comprises the trigger data and was stored within the predetermined time threshold of the current time, generate a customized audio interactive voice response (IVR) menu based on the browsing data and present the customized audio IVR menu to the user over the phone call.

Disclosed embodiments may include a communication menu generating system that includes one or more processors and a memory in communication with the one or more processors and storing instructions are configured to cause the communication menu generating system to perform a method. The method may include receiving, via a browser extension or an application, browsing data from a user device associated with a user that is authenticated with the browser extension or the application, and determining whether the browsing data comprises trigger data indicating a trigger website was visited. When the browsing data includes the trigger data, generate a text message or a push notification with a customized link for the user, the customized link, when activated, navigates the user device to a menu customized based on the trigger data, and send the text message or push notification to the user device.

In some embodiments, when the browsing data does not comprise the trigger data, monitor new browsing data received for trigger data.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
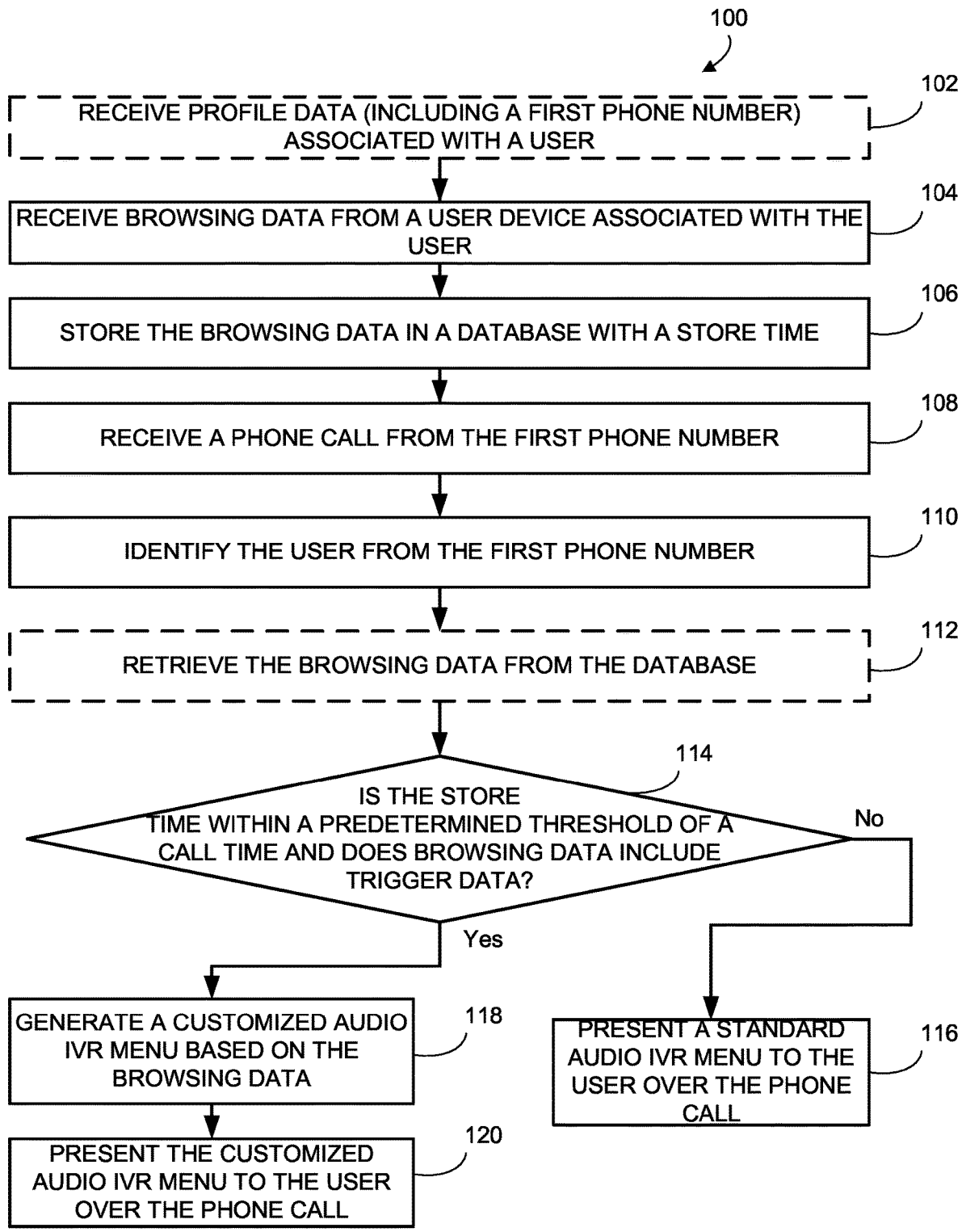
FIG. 1 is a flow diagram 100 illustrating examples of methods for generating a customized IVR menu for a customer call based on browsing data, in accordance with certain embodiments of the disclosed technology.

FIG. 1 is a flow diagram 100 illustrating examples of methods for generating a customized IVR menu for a customer call based on browsing data, in accordance with certain embodiments of the disclosed technology. The steps of method 100 may be performed by one or more components of a menu customizing system 404 (e.g., a menu generating system 320, a web server 410, an API server 422, a call center server 412, or a natural language processing (NLP) device) or the third party server 426, as described in more detail with respect to FIGS. 3-4.

In optional block 102, the menu customizing system 404 (e.g., menu generating system 320) may receive profile data associated with a user. The profile data may include a first phone number.

In block 104, the menu customizing system 404 (e.g., menu generating system 320) may receive browsing data from a user device associated with the user. The browsing data may be collected and transmitted via a browser plug-in (a.k.a. browser extension) or an application (e.g., mobile application). In some embodiments, the browsing data may be collected and transmitted based on cookies from a particular website. The browser plug-in or application may authenticate a user by requiring the user to submit a username and password. The cookies or other digital footprint capabilities may also be used in conjunction with authenticating a user so that the owner of a particular website knows which webpages a user has visited.

In block 106, the menu customizing system 404 (e.g., menu generating system 320) may store the browsing data in a database with a store time. The store time may be the time that the storage occurs.

In block 108, the menu customizing system 404 (e.g., menu generating system 320 and/or a call center server 412) may receive a phone call from the first phone number.

In block 110, the menu customizing system 404 (e.g., menu generating system 320 and/or call center server 412) may identify the user from the first phone number. In an embodiment, the menu customizing system 404 uses caller identification (ID) to determine the phone number of the caller. The menu customizing system 404 then compares that phone to phone numbers stored in a database (e.g., database 380, 444, or 418) associated with various users' profile data. When the menu customizing system 404 finds a match for the phone number in the stored phone numbers, the menu customizing system 404 retrieves other profile data associated with the phone number (e.g., name) to identify the caller.

In optional block 112, the menu customizing system 404 (e.g., menu generating system 320) may retrieve at least a portion of the browsing data associated with the user from the database. For example, the menu customizing system 404 may retrieve any predetermined amount of time (e.g., the last 2 hours, 12 hours, 24 hours) of browsing data based on the stored time so that the menu customizing system 404 is retrieving a reasonable amount of browsing data and the most relevant browsing data.

In block 114, the menu customizing system 404 (e.g., menu generating system 320) may determine whether the store time for the retrieved browsing data is within a time threshold of the call time and whether the retrieved browsing data includes trigger data.

The trigger data may be any data that is pre-flagged by the system to qualify as trigger data. For example, trigger data may be browsing data corresponding to a new loan application or a section of an application (e.g., a mobile application) corresponding to a new loan application. As another example, the trigger data may correspond to a new credit card application website or a new credit card application section of an application (e.g., mobile application). As another example, the trigger data may correspond to a credit limit increase request website or a credit limit increase request section of an application (e.g. mobile application). As a further example, the trigger data may correspond to placing a product or service into an online shopping cart. As another example, the trigger data may correspond to an error on a webpage or a section of an application (e.g., mobile application). As a further example, trigger data may be based on a threshold amount of time spent on a particular webpage of a website or a particular section of an application. The extra time spent beyond a threshold amount on a webpage may correspond to confusion of a user.

The trigger data may correspond to a deviation of typical patterns of the user. The typical patterns may be learned and continuously updated based on recognized patterns in a user's behavior in visiting a website or within an application. Similarly, the typical patterns may be learned and continuously updated based on recognized patterns from multiple users' behavior (aggregate behavior). For example, if a user typically checks all account balances before transferring money and then signs off, but today the user tries to transfer money without checking account balances, this may qualify as trigger data. The menu customizing system 404 (e.g., a menu generating system 320) may employ one or more machine learning techniques (e.g., neural network) to determine a user's typical patterns and deviations from them. The one machine learning technique may be trained using browsing data from a plurality of users using a website or application such that patterns emerge (e.g., most users check one or more account balances before transferring money from or between one or more accounts). The one or more machine learning techniques may be updated continuously based on ongoing browsing of the plurality of users and one or more new users via a website or application.

When the browsing data does not comprise the trigger data or the store time is not within the time threshold (e.g., thirty or sixty minutes) of the call time, as shown at block 116, the menu customizing system 404 (e.g., menu generating system 320) may present a default audio interactive voice response (IVR) menu to the user over the phone call.

Conversely, when the browsing data includes the trigger data and the store time is within the time threshold of the call time, as shown at block 118, the menu customizing system 404 (e.g., menu generating system 320) may generate a customized IVR menu based on the browsing data. The customized IVR menu may be customized IVR dialogue (e.g., menu prompts) that allows a user to select options by interacting with the customized IVR dialogue (either by pushing buttons (e.g., numerical buttons) or saying the option). In some embodiments, the menu customizing system 404 (e.g., menu generating system 320) may detect that the user is currently browsing the internet via the browser plug-in and generate a visual IVR menu in a customized website. In some embodiments, the browser plugin may present IVR menu options by initiate a popup window, overlaying the IVR menu options over a webpage currently visited by the user, or dynamically add the IVR menu options to the current webpage. In some embodiments, the menu customizing system 404 (e.g., menu generating system 320)) may detect that the user is currently browsing the internet or a particular website via cookies or other device or user tracking algorithms. The IVR menu may include at least two menu items related to the trigger data.

In block 120, the menu customizing system 404 (e.g., menu generating system 320) may present the customized IVR menu to the user over the phone call by playing customized IVR dialogue of options for the user to select by pressing a button or saying the option. In some embodiments, the menu customizing system 404 (e.g., menu generating system 320) may provide visually provide the customized IVR menu options for a user to select via a pop-up window, pushing a link to the user's device which directs a user to a customized webpage or application, or an overlay of a webpage the user is currently at using a browser plug-in. The user may then select one of the available options in the customized IVR menu and have their phone call directed to the appropriate resource or routing path.

Essentially, the menu customizing system 404 (e.g., menu generating system 320) may facilitate a dual channel interaction between a customized visual IVR menu and an active phone call from a user to direct a user's phone call to the appropriate resource. When a user calls a particular organization using the menu customizing system 404, the system detects the call and associates it with the user's browsing data, generates a customized (audio or visual) IVR menu and presents that customized IVR menu to the user to increase the speed to which he is able to find the resource he intended. When the user selects an option on the customized visual IVR menu, then an active call from that user is redirected to a desired recipient. In some embodiments, this IVR menu may be dynamically generated such that when a user selects an option, it may change to give the user additional customized options. In other embodiments, customized IVR menu may change and respond to a user's interaction with a webpage or a section of an application to provide more relevant options.

Figure 2:
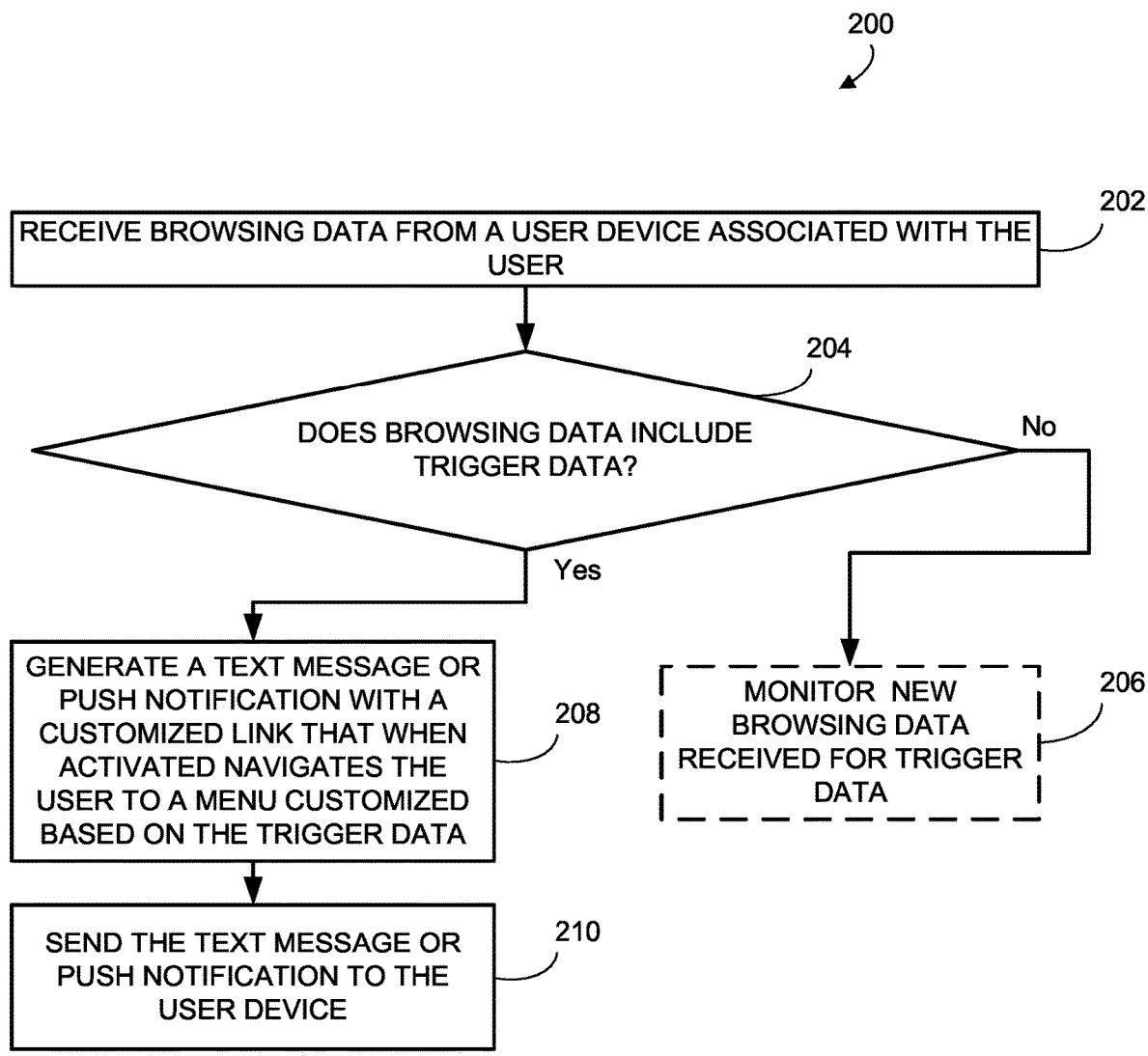
FIG. 2 is a flow diagram 200 illustrating examples of methods for generating a customized menu to resolve a user's issue, in accordance with certain embodiments of the disclosed technology.

FIG. 2 is a flow diagram 200 illustrating examples of methods for generating a customized menu to resolve a user's issue, in accordance with certain embodiments of the disclosed technology. The steps of method 100 may be performed by any component of the menu customizing system 404 (e.g., the menu generating system 320).

In block 202, the menu customizing system 404 (e.g., menu generating system 320) may receive browsing data from a user device associated with the user.

In block 204, the menu customizing system 404 (e.g., menu generating system 320) may determine whether the browsing data includes trigger data. When the menu customizing system 404 (e.g., menu generating system 320) determines that the browsing data does not include trigger data, optionally proceed to block 206. When the menu customizing system 404 (e.g., menu generating system 320) determines that the browsing data includes trigger data, proceed to block 208.

In optional block 206, the menu customizing system 404 (e.g., menu generating system 320) may monitor new browsing data received for trigger data.

In block 208, the menu customizing system 404 (e.g., menu generating system 320) may generate a text message or push notification with a customized link that when activated navigates the user to a menu customized based on the trigger data. The customized IVR menu may include menu items that correspond to the trigger data. For example, if the browsing data includes data corresponding to the user visiting a website associated with a credit card application and that website is predetermined to be trigger data, then the customized IVR menu may include a visual option to apply for a credit card or a particular credit card corresponding to the credit card the user was viewing.

In block 210, the menu customizing system 404 (e.g., menu generating system 320) may send the text message or push notification to the user device. Upon receiving the text message or the push notification, the user may be presented with options from the customized IVR menu. When the user selects one of the options from the customized IVR menu (e.g., by clicking a button or a link), the phone call is directed in real-time to the most effective resource associated with the selected customized IVR menu option or the user is given another subset of customized IVR menu options based on the user's selection. The user's real-time interaction with a digital menu effects real-time routing of the user's phone call or altering of options for the user to select.

Figure 3:
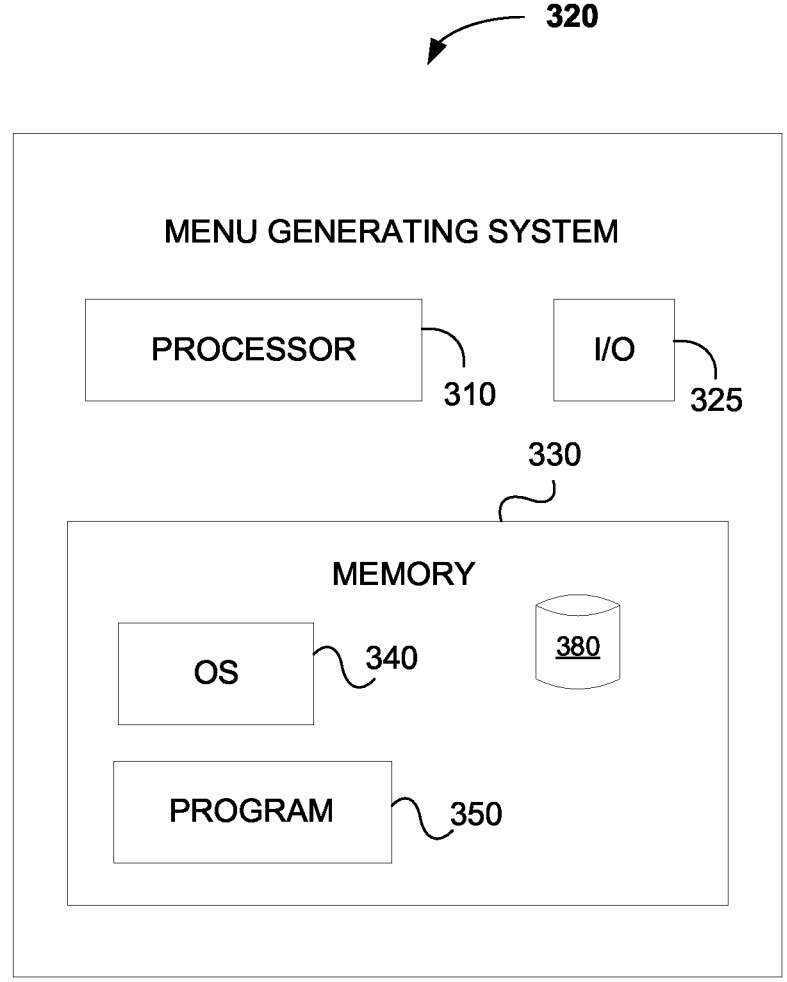
FIG. 3 is a block diagram of a menu generating system 320 used to generate a customized menu for a user aimed at resolving the user's problem, according to an example implementation of the disclosed technology.
Figure 4:
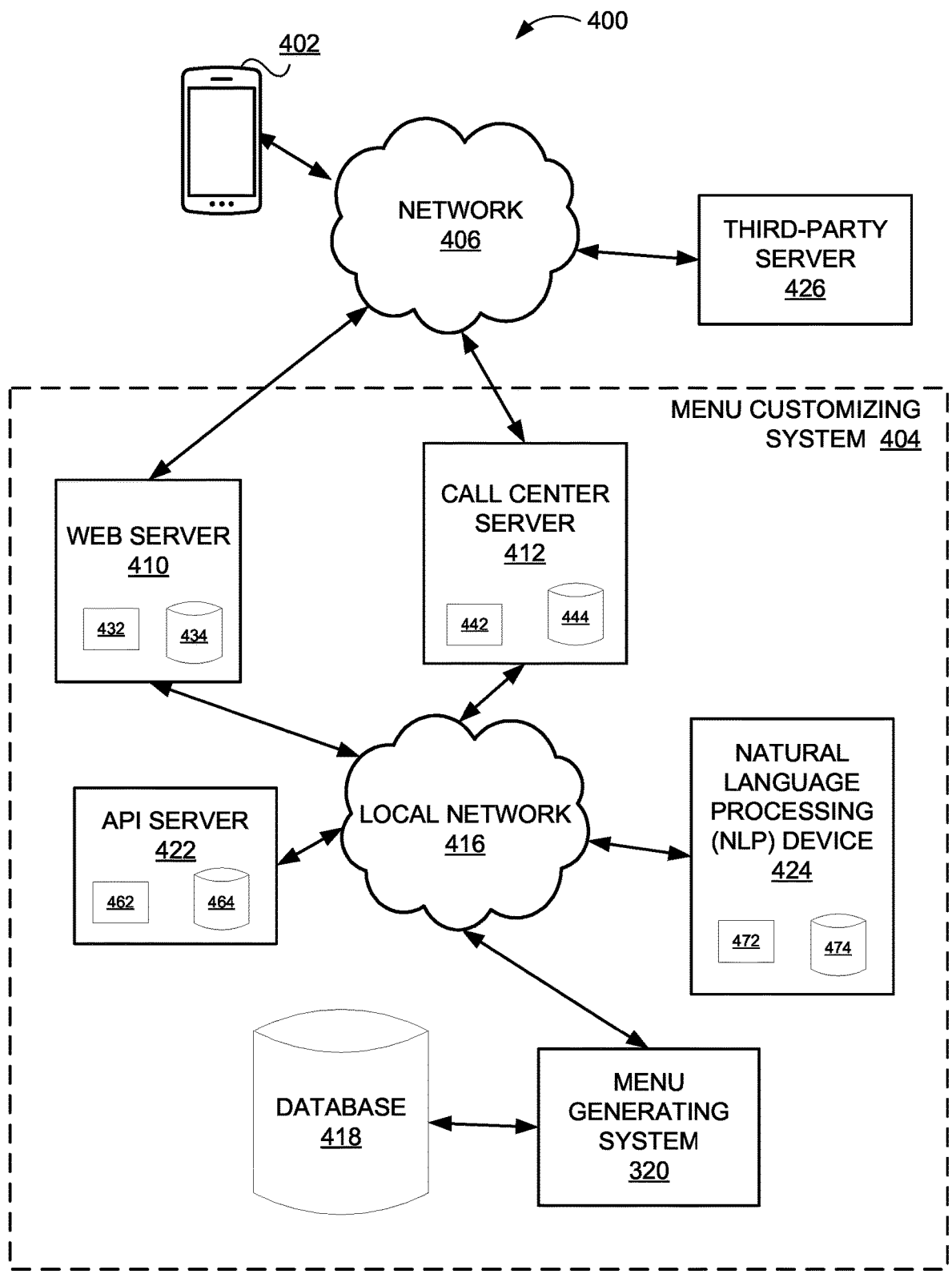
FIG. 4 is a block diagram of an example system 400 that may be used to generate a customized menu aimed at resolving the user's problem, according to an example implementation of the disclosed technology.

FIG. 3 is a block diagram of the example menu generating system 320, as also depicted in FIG. 4. According to some embodiments, the user device 402, the web server 410, the call center server 412, the API server 422, the NLP device 424, and the third-party server 426, as depicted in FIG. 4 and described below, may have a similar structure and components that are similar to those described with respect to menu generating system 320 shown in FIG. 3. As shown, the menu generating system 320 may include a processor 310, an input/output ("I/O") device 325, a memory 330 containing an operating system ("OS") 340 and a program 350. In certain example implementations, the menu generating system 320 may be a single server or may be configured as a distributed computer system including multiple servers or computers that interoperate to perform one or more of the processes and functionalities associated with the disclosed embodiments. In some embodiments, the menu generating system 320 may further include a peripheral interface, a transceiver, a mobile network interface in communication with the processor 310, a bus configured to facilitate communication between the various components of the menu generating system 320, and a power source configured to power one or more components of the menu generating system 320

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Pentium™ family manufactured by Intel™ or the Turion™ family manufactured by AMD™. The processor 310 may constitute a single core or multiple core processor that executes parallel processes simultaneously. For example, the processor 310 may be a single core processor that is configured with virtual processing technologies. In certain embodiments, the processor 310 may use logical processors to simultaneously execute and control multiple processes. The processor 310 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the menu generating system 320 may include one or more storage devices configured to store information used by the processor 310 (or other components) to perform certain functions related to the disclosed embodiments. In one example, the menu generating system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the menu generating system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the menu generating system 320 may include the memory 330 that may include one or more programs 350 to perform one or more functions of the disclosed embodiments. For example, in some embodiments, the menu generating system 320 may additionally manage dialogue and/or other interactions with the customer via a program 350.

The processor 310 may execute one or more programs 350 located remotely from the system 400 (such as the system shown in FIG. 4). For example, the system 400 may access one or more remote programs 350, that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a customer information database 380 for storing related data to enable the menu generating system 320 to perform one or more of the processes and functionalities associated with the disclosed embodiments.

The customer information database 380 may include stored data relating to a customer profile and customer accounts, such as for example, customer identification, browsing habits, name, age, sex, birthday, address, account status, preferences, preferred language, greeting name, preferred communication channel, account numbers, order history, delivery history, authorized users associated with one or more accounts, account balances, account payment history, and other such typical account information. The customer information database 380 may further include stored data relating to previous interactions between the menu customizing system 404 and a customer. For example, the customer information database 380 may store customer interaction data that includes records of previous customer service interactions with a customer via a website, SMS, a chat program, a mobile application, an IVR system, or notations taken after speaking with a customer service agent.

The customer information database 380 may also include customer feedback data such as an indication of whether an automated interaction with a customer was successful, online surveys filled out by a customer, surveys answered by a customer following previous interactions to the company, digital feedback provided through websites or mobile applications associated with the organization or its related entity (e.g., selecting a smiley face or thumbs up to indicate approval), reviews written by a customer, complaint forms filled out by a customer, information obtained from verbal interactions with customer (e.g., information derived from a transcript of a customer service call with a customer that is generated using, for example, voice recognition techniques and/or by NLP device 424) or any other types of communications from a customer to the organization or its related entity. According to some embodiments, the functions provided by the customer information database may also be provided by a database that is external to the menu generating system 320, such as the database 418 as shown in FIG. 4.

The menu generating system 320 may also be communicatively connected to one or more memory devices (e.g., databases) locally or through a network. The remote memory devices may be configured to store information and may be accessed and/or managed by the menu generating system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The menu generating system 320 may also include one or more I/O devices 325 that may comprise one or more interfaces for receiving signals or input from devices and providing signals or output to one or more devices that allow data to be received and/or transmitted by the menu generating system 320. For example, the menu generating system 320 may include interface components, which may provide interfaces to one or more input devices, such as one or more keyboards, mouse devices, touch screens, track pads, trackballs, scroll wheels, digital cameras, microphones, sensors, and the like, that enable the menu generating system 320 to receive data from one or more users (such as, for example, via the user device 402).

In example embodiments of the disclosed technology, the menu generating system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the menu generating system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the menu generating system 320 may include a greater or lesser number of components than those illustrated.

FIG. 4 is a block diagram of an example system 400 that may be used to dynamically generate contextually aware IVR system or menu to direct a user's phone call to efficiently resolve a user's questions or problems encountered online. The system 400 may be configured to perform one or more processes that can adaptively and dynamically generate responses based on an evolving context associated with customer interactions, orders, goods, services, etc. The components and arrangements shown in FIG. 4 are not intended to limit the disclosed embodiments as the components used to implement the disclosed processes and features may vary. As shown, system 400 may interact with a user device 402 via a network 406. In certain example implementations, the system 400 may include a web server 410, a call center server 412, a local network 416, an menu generating system 320, a database 418, an API server 422, and an NLP device 424 (which may be referred to herein as an NLP device).

In some embodiments, a customer may operate the user device 402. The user device 402 can include one or more of a mobile device, smart phone, general purpose computer, tablet computer, laptop computer, telephone, PSTN landline, smart wearable device, voice command device, other mobile computing device, or any other device capable of communicating with the network 406 and ultimately communicating with one or more components of the system 400. In some embodiments, the user device 402 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from an entity associated with the system 400. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network using a public network, and/or other suitable connection(s) that enable(s) components in the system 400 environment to send and receive information between the components of the system 400. The network 406 may also include a public switched telephone network ("PSTN") and/or a wireless network.

In accordance with certain example implementations, a third-party server 426 may be in communication with the system 400 via the network 406. In certain implementations, the third-party server 426 can include a computer system associated with an entity (other than the entity associated with the system 400 and its customers) that performs one or more functions associated with the customers. For example, the third-party server 426 can include a server that collects browsing data from one or more users and provides that browsing data to the menu generating system 320.

The system 400 may be associated with and optionally controlled by an entity such as a business, corporation, individual, partnership, or any other entity that provides one or more of goods, services, and consultations to individuals such as customers. The system 400 may include one or more servers and computer systems for performing one or more functions associated with products and/or services that the organization provides. Such servers and computer systems may include, for example, the web server 410 and/or the call center server 412, as well as any other computer systems necessary to accomplish tasks associated with the organization or the needs of customers (which may be customers of the entity associated with the organization). The web server 410 may include a computer system configured to generate and provide one or more websites accessible to customers, as well as any other individuals involved in an organization's normal operations. The web server 410, for example, may include a computer system configured to receive communications from the user device 402 via for example, a mobile application, a chat program, an instant messaging program, a voice-to-text program, an SMS message, email, or any other type or format of written or electronic communication. The web server 410 may have one or more processors 432 and one or more web server databases 434, which may be any suitable repository of website data. Information stored in the web server 410 may be accessed (e.g., retrieved, updated, and added to) via the local network 416 (and/or the network 406) by one or more devices (e.g., the menu generating system 320 and/or the NLP device 424) of the system 400.

The call center server 412 may include a computer system configured to receive, process, and route telephone calls and other electronic communications between a customer operating a user device 402 and the menu generating system 320. The call center server 412 may have one or more processors 442 and one or more call center databases 444, which may be any suitable repository of call center data. Information stored in the call center server 412 may be accessed (e.g., retrieved, updated, and added to) via the local network 416 (and/or network 406) by one or more devices of the system 400. In some embodiments, the call center server processor 442 may be used to implement an interactive voice response (IVR) system that interacts with the customer over the phone.

The local network 416 may include any type of computer networking arrangement used to exchange data in a localized area, such as WiFi, Bluetooth™ Ethernet, and other suitable network connections that enable components of the system 400 to interact with one another and to connect to the network 406 for interacting with components in the system 400 environment. In some embodiments, the local network 416 may include an interface for communicating with or linking to the network 406. In other embodiments, certain components of the system 400 may communicate via the network 406, without a separate local network 416.

In accordance with certain example implementations of the disclosed technology, the menu generating system 320, which is described more fully with reference to FIG. 3, may include one or more computer systems configured to compile data from a plurality of sources, such as the web server 410, the call center server 412, and/or the database 418. The menu generating system 320 may correlate compiled data, analyze the compiled data, arrange the compiled data, generate derived data based on the compiled data, and store the compiled and derived data in a database such as the database 418. According to some embodiments, the database 418 may be a database associated with an organization and/or a related entity that stores a variety of information relating to customers, transactions, and business operations. The database 418 may also serve as a back-up storage device and may contain data and information that is also stored on, for example, databases 434, 444, 464, 474 (and 380, as discussed with reference to FIG. 3). The database 418 may be accessed by the menu generating system 320 and may be used to store records of every interaction, communication, and/or transaction a particular customer has had with the menu customizing system 404 and/or its related entity in the past to enable the creation of an ever-evolving customer context that may enable the menu generating system 320, in conjunction with the NLP device 424, to generate hypotheses associated with perceived customer irregularities that may be extracted from one or more customer utterances.

In certain example implementations, the API server 422 may include one or more computer systems configured to execute one or more application program interfaces (APIs) that provide various functionalities related to the operations of the system 400. In some embodiments, the API server 422 may include API adapters that enable the API server 422 to interface with and utilize enterprise APIs maintained by an organization and/or an associated entity that may be housed on other systems or devices. In some embodiments, APIs can provide functions that include, for example, retrieving customer account information, modifying customer account information, retrieving an application status (e.g., a credit application status), retrieving a website error, and any other such function related to management of customer profiles, accounts, and website data. The API server 422 may include one or more processors 462 and one or more API databases 464, which may be any suitable repository of API data. Information stored in the API server 422 may be accessed (e.g., retrieved, updated, and added to) via the local network 416 (and/or network 406) by one or more devices (e.g., menu generating system 320) of system 400. In some embodiments, the API processor 462 may be used to implement one or more APIs that can access, modify, and retrieve customer account information.

In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, the transaction server 414) to exchange data with a server that implements the API (such as, for example, the API server 422), in a request-response pattern. In certain embodiments, the request-response pattern defined by the API may be configured in a synchronous fashion and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/json" content-type. In another aspect, an API design may also require the server implementing the API return messages in JSON format in response to the request calls from the client.

In accordance with certain example implementations of the disclosed technology, the NLP device 424 may include a computer system configured to receive and process incoming messages and determine a meaning of the incoming message. For example, the NLP device 424 may be configured to receive and execute commands (for example, from the menu generating system 320) that instructs the NLP device 424 to determine the meaning of the incoming dialogue message. In certain example implementations, the menu generating system 320 may issue dialog modifying commands to the NLP device 424, for example, that instruct the NLP device 424 to formulate/revise a response based on rules and/or determined information related to the customer communication, specifics related to an order, etc. Thus, in certain example implementations, the menu generating system 320 may program the NLP device 424.

The NLP device 424 may include one or more processors 472 and one or more NLP databases 474, which may be any suitable repository of NLP data. Information stored in the NLP device 424 may be accessed (e.g., retrieved, updated, and added to) via the local network 416 (and/or network 406) by one or more devices (e.g., the menu generating system 320) of system 400. In some embodiments, the NLP processor 472 may be used to implement an NLP system that can determine the meaning behind a string of text and convert it to a form that can be understood by other devices.

Although described in the above embodiments as being performed by the web server 410, the call center server 412, the menu generating system 320, the database 418, the API server 422, and the NLP device 424, some or all of those functions may be carried out by a single computing device.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

Jane opens her computer (e.g., user device 102) and navigates to the Capital One website for a browser plug-in. At the website, Jane fills out a form to include her profile data (e.g., name, username, phone number, email, address, etc.) and the menu customizing system 404 receives and stores the entered profile data. Then Jane downloads and installs a browser plug-in from the Capital One website to her computer (e.g., user device 102). After installing the browser plug-in to her computer (e.g., user device 102), Jane authenticates herself by providing the browser plug-in with her username (e.g., email or phone number) and password. Then, Jane navigates to a webpage on the Capital One website for applying for a credit card on her computer (e.g., user device 102). The browser plug-in tracks and sends the websites that Jane visits to the menu customizing system 404 for storage in a database along with a store time (i.e., the time that the browsing data is stored). Although this example utilized a browser plug-in, one is not necessary. Cookies or other tracking mechanisms may be used to track and collect a user's browsing data. Regardless of the exact mechanism to collect browsing data, the user may fill out the application. While filling out the application, the webpage freezes and she is unable to complete the application. Jane tries to refresh the webpage, but it does not solve the problem. Within 30 minutes of the webpage freezing, Jane calls Capital One's customer service number with her phone associated with the phone number she provided in her profile data prior to downloading the browser plug-in. The menu customizing system 404 receives the phone call from Jane and identifies that the caller is Jane based on matching her phone number to the previously stored phone number from her profile data. The menu customizing system 404 may retrieve the browsing data from a database and then determine whether the store time associated with the browsing data is within a predetermined threshold (e.g., 1 hour) of the time of Jane's call to customer server. The menu customizing system 404 may also determine whether the browsing data includes trigger data (e.g., an error in a webpage or particular webpage of interest such as a credit card application webpage).

Here, the call time was only 30 minutes after the storage of the browsing data by the menu customizing system 404. Additionally, the browsing data included trigger data because it included the frozen webpage (an error) and Jane was on a particular webpage of interest (a credit card application webpage). Thus, the menu customizing system 404 generated a customized audio IVR menu based on the browsing data (or more particularly the trigger data) and presented that customized audio IVR menu to the user. The customized audio IVR is directed to the unique issues facing Jane (e.g., a choice on how to continue filling out a credit card application with a representative based on where she left off) instead of working her way through a long list of default menu options. Disclosed embodiments may include a communication menu generating system that includes one or more processors and a memory in communication with the one or more processors and storing instructions are configured to cause the communication menu generating system to perform a method. The method may include receiving profile data associated with a user, the profile data comprising a first phone number, receiving browsing data from a user device associated with the user, storing the browsing data with a store time, receiving a phone call from the first phone number at a call time, identifying the user from the first phone number, retrieving the browsing data, determining whether the store time is within a time threshold of the call time and whether the browsing data comprises trigger data. When the browsing data does not comprise the trigger data or the store time is not within the time threshold of the call time, present a default audio interactive voice response (IVR) menu to the user over the phone call. When the browsing data comprises the trigger data and the store time is within the time threshold of the call time, generate a customized audio IVR menu based on the browsing data and present the customized audio IVR menu to the user over the phone call.

In some embodiments, the customized audio IVR menu includes at least two menu options related to the trigger data.

In some embodiments, the at least two menu options are ordered based on the trigger data.

In some embodiments, the trigger data corresponds to a section of an application.

In some embodiments, the trigger data corresponds to an error with a section of an application.

In some embodiments, the trigger data corresponds to a deviation of typical interaction patterns of the user with an application.

In some embodiments, the time threshold is thirty or sixty minutes.

In some embodiments, the browsing data is received from the user device via a plug-in, an application, or both that have authenticated the user.

Disclosed embodiments may include a communication menu generating system that includes one or more processors and a memory in communication with the one or more processors and storing instructions are configured to cause the communication menu generating system to perform a method. The method may include receiving browsing data from a user device associated with a user, storing the browsing data in a database, receiving a phone call from a first phone number that was previously stored in the database, identifying the user from the first phone number previously stored in the database, determining whether the browsing data was stored within a predetermined time threshold of a current time and comprises trigger data. When the browsing data does not comprise the trigger data or was not stored within the predetermined time threshold of the current time, present a standard audio IVR menu to the user over the phone call. When the browsing data comprises the trigger data and was stored within the predetermined time threshold of the current time, generate a customized audio interactive voice response (IVR) menu based on the browsing data and present the customized audio IVR menu to the user over the phone call.

In some embodiments, the customized audio IVR menu includes at least two menu items related to the trigger data.

In some embodiments, the trigger data corresponds to a new loan application website or a new loan application section of an application.

In some embodiments, the trigger data corresponds to a new credit card application website or a new credit card application section of an application.

In some embodiments the trigger data corresponds to placing a product or a service into an online cart.

In some embodiments, the trigger data corresponds to an error on a webpage or on a section of an application.

In some embodiments, the trigger data corresponds to a deviation of typical interaction patterns of the user.

In some embodiments, the predetermined time threshold is thirty or sixty minutes.

In some embodiments, the browsing data is received from the user device via a browser extension, a mobile application, or both that have authenticated the user.

Disclosed embodiments may include a communication menu generating system that includes one or more processors and a memory in communication with the one or more processors and storing instructions are configured to cause the communication menu generating system to perform a method. The method may include receiving, via a browser extension or an application, browsing data from a user device associated with a user that is authenticated with the browser extension or the application, and determining whether the browsing data comprises trigger data indicating a trigger website was visited. When the browsing data includes the trigger data, generate a text message or a push notification with a customized link for the user, the customized link, when activated, navigates the user device to a menu customized based on the trigger data, and sends the text message or push notification to the user device.

In some embodiments, when the browsing data does not comprise the trigger data, monitor new browsing received for trigger data.

In some embodiments, the trigger data corresponds to a section of an application (e.g., credit card application).

What is claimed is:

1. A communication menu generating system, comprising:
   one or more processors; and
   a memory in communication with the one or more processors and storing instructions that are configured to cause the communication menu generating system to:
   receive browsing data from a user device associated with a user at a first time;
   receive a phone call at a second time;
   determine whether the first time is within a time threshold of the second time and whether the browsing data comprises trigger data;
   when the browsing data does not comprise the trigger data or the first time is not within the time threshold of the second time, present a default audio interactive voice response (IVR) menu to the user over the phone call;
   when the browsing data comprises the trigger data and the first time is within the time threshold of the second time:
     generate a customized audio IVR menu based on the browsing data; and
     present the customized audio IVR menu to the user over the phone call.

2. The communication menu generating system of claim 1, wherein the customized audio IVR menu comprises at least two menu options related to the trigger data.

3. The communication menu generating system of claim 2, wherein the at least two menu options are ordered based on the trigger data.

4. The communication menu generating system of claim 1, wherein the trigger data corresponds to a section of an application.

5. The communication menu generating system of claim 1, wherein the trigger data corresponds to an error with a section of an application.

6. The communication menu generating system of claim 1, wherein the trigger data corresponds to a deviation of typical interaction patterns of the user with an application.

7. The communication menu generating system of claim 1, wherein the time threshold is thirty or sixty minutes.

8. The communication menu generating system of claim 1, wherein the browsing data is received from the user device via a plug-in, an application, or both that have authenticated the user.

9. A system, comprising:
   one or more processors; and
   a memory in communication with the one or more processors and storing instructions that, when executed by the one or more processors, are configured to cause the system to:
   receive browsing data from a user device associated with a user;
   receive a phone call from a first phone number that was previously stored in the database;
   identify the user from the first phone number previously stored in the database;
   determine whether the browsing data was received within a predetermined time threshold of a current time and comprises trigger data;
   when the browsing data does not comprise the trigger data or was not received within the predetermined time threshold of the current time, present a standard audio IVR menu to the user over the phone call;
   when the browsing data comprises the trigger data and was stored within the predetermined time threshold of the current time:
     generate a customized audio interactive voice response (IVR) menu based on the browsing data; and
     present the customized audio IVR menu to the user over the phone call.

10. The system of claim 9, wherein the customized audio IVR menu comprise at least two menu items related to the trigger data.

11. The system of claim 9, wherein the trigger data corresponds to a new loan application website or a new loan application section of an application.

12. The system of claim 9, wherein the trigger data corresponds to a new credit card application website or a new credit card application section of an application.

13. The system of claim 9, wherein the trigger data corresponds to placing a product or a service into an online cart.

14. The system of claim 9, wherein the trigger data corresponds to an error on a webpage or on a section of an application.

15. The system of claim 9, wherein the trigger data corresponds to a deviation of typical interaction patterns of the user.

16. The system of claim 9, wherein the predetermined time threshold is thirty or sixty minutes.

17. The system of claim 9, wherein the browsing data is received from the user device via a browser extension, a mobile application, or both that have authenticated the user.

18. A system, comprising:
   one or more processors; and
   a memory in communication with the one or more processors and storing instructions that, when executed by the one or more processors, are configured to cause the system to:
   receive, via a browser extension or an application at a first time, browsing data from a user device associated with a user that is authenticated with the browser extension or the application;
   receive a phone call from a phone number associated with the user;
   determine whether the first time is within a time threshold of the phone call and whether the browsing data comprises trigger data;
   when the browsing data comprises the trigger data and the store time is within the time threshold of the phone call:
     generate a text message or a push notification with a customized link for the user, the customized link, when activated, navigates the user device to a menu customized based on the trigger data; and
     send the text message or push notification to the user device.

19. The system of claim 18, wherein the memory stores further instructions that, when executed by the one or more processors, are further configured to cause the system to:
   when the browsing data does not comprise the trigger data, monitor new browsing received for trigger data.

20. The system of claim 18, wherein the trigger data corresponds to a section of an application.

\* \* \* \* \*